United States Patent
Richter et al.

(10) Patent No.: US 11,199,992 B2
(45) Date of Patent: Dec. 14, 2021

(54) AUTOMATIC HOST BUFFER POINTER PATTERN DETECTION

(71) Applicant: Western Digital Technologies, Inc., San Jose, CA (US)

(72) Inventors: Elkana Richter, Tene-Omarim (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/512,312

(22) Filed: Jul. 15, 2019

(65) Prior Publication Data
US 2021/0019077 A1    Jan. 21, 2021

(51) Int. Cl.
*G06F 3/06*    (2006.01)

(52) U.S. Cl.
CPC .......... *G06F 3/0655* (2013.01); *G06F 3/0604* (2013.01); *G06F 3/0679* (2013.01)

(58) Field of Classification Search
USPC .............................. 710/5–7, 39, 68; 711/154
See application file for complete search history.

(56) References Cited

U.S. PATENT DOCUMENTS

| | | | |
|---|---|---|---|
| 7,424,566 B2 | 9/2008 | Manula et al. | |
| 10,069,597 B2 | 9/2018 | Benisty et al. | |
| 10,095,645 B2 | 10/2018 | Davis et al. | |
| 10,628,369 B2 | 4/2020 | Minato et al. | |
| 2003/0188054 A1* | 10/2003 | Yosimoto | G06F 13/28 710/22 |
| 2009/0037689 A1* | 2/2009 | Kanuri | G06F 13/385 711/208 |
| 2015/0254022 A1* | 9/2015 | Oikawa | G06F 3/0608 711/103 |
| 2016/0188473 A1* | 6/2016 | Kruckemyer | G06F 12/0815 711/141 |
| 2017/0116117 A1* | 4/2017 | Rozen | G06F 12/0246 |
| 2017/0285940 A1* | 10/2017 | Benisty | G06F 3/0688 |
| 2018/0136869 A1* | 5/2018 | Mola | G06F 11/30 |
| 2020/0112525 A1* | 4/2020 | Donley | H04L 45/742 |

OTHER PUBLICATIONS

Kim et al. "Optimized I/O Determininsm for Emerging NVM-based NVMe SSD in an Enterprise System," Proceedings of the 55th Annual Design Automation Conference, Jun. 24, 2018, 6 pages.
Related U.S. Appl. No. 17/184,531, filed Feb. 24, 2021.

* cited by examiner

*Primary Examiner* — Ilwoo Park
(74) *Attorney, Agent, or Firm* — Patterson & Sheridan, LLP; Steven H. Versteeg

(57) ABSTRACT

The present disclosure generally relates to a method and device for detecting patterns in host command pointers. When a new command is received by a storage device from a host computer, host command pointers sent to the storage device are analyzed to detect any patterns within the host command pointers. If a pattern is detected, the storage device can store the host command pointers in a reduced pointer storage structure. Thereafter, the storage device can perform the command indicated by the host command pointers using the reduced pointer storage structure.

20 Claims, 4 Drawing Sheets

AUTOMATIC HOST BUFFER POINTER PATTERN DETECTION

BACKGROUND OF THE DISCLOSURE

Field of the Disclosure

Embodiments of the present disclosure generally relate to a method and device for interpreting commands received by a storage device from a host computer.

Description of the Related Art

Storage devices are frequently connected to host computers over the non-volatile memory express (NVMe) interface. In such systems, the host computer initiates data transfers by preparing a data buffer containing the data to be transferred to the storage device, or from the storage device. In NVMe, the physical memory locations of the data buffer are indicated by either physical region page (PRP) entries or scatter gather lists (SGL). Using either PRP or SGL, the host computer transfers pointers to the physical memory locations to the storage device, as host command pointers. The host computer sends as many pointers as physical memory locations are used in storing the data for transfer.

In current systems, the storage device receives the host command pointers and stores the host command pointers in a pointer structure until all host command pointers are received and stored. Then, when a data segment is available for transfer, the storage device searches the stored pointers for the matching pointer and begins the data transfer. However, this process presents problems in current systems. For example, for large numbers of pointers, the process of searching for the matching pointer may be time consuming. Additionally, the memory needed to store the pointers restricts the memory otherwise available to the storage device for other tasks. Therefore, systems and methods are needed to reduce the storage and time costs of executing host computer commands in storage devices.

SUMMARY OF THE DISCLOSURE

The present disclosure generally relates to a method and device for detecting patterns in host command pointers. When a new command is received by a storage device from a host computer, host command pointers sent to the storage device are analyzed to detect any patterns within the host command pointers. If a pattern is detected, the storage device can store the host command pointers in a reduced pointer storage structure. Thereafter, the storage device can perform the command indicated by the host command pointers using the reduced pointer storage structure.

In one embodiment, a storage device including a non-volatile memory and a controller is provided. The controller is configured to, upon receipt of a host command from a host computer connected to the storage device, analyze host command pointers associated with the host command for a host command pattern; and upon detecting the host command pattern, store the host command pointers in a reduced pointer structure.

In another embodiment, a method for detecting patterns in host command pointers is provided. The method includes receiving, at a storage device including a non-volatile memory from a host computer, at least one host command pointer associated with a host command and detecting, based on the at least one host command pointer, a host command pattern of the host command. The method further includes storing, in a reduced pointer structure, the at least one host command pointer.

In another embodiment, a storage device including a non-volatile memory and a controller is provided. The controller is configured to receive, at a storage device including a non-volatile memory from a host computer, at least one host command pointer associated with a host command and detect, based on the at least one host command pointer, a host command pattern of the host command. The storage device is further configured to store, in a reduced pointer structure, the at least one host command pointer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a method and device for detecting patterns in host command pointers.

When a new command is received by a storage device from a host computer, host command pointers sent to the storage device are analyzed to detect any patterns within the host command pointers. If a pattern is detected, the storage device can store the host command pointers in a reduced pointer storage structure. Thereafter, the storage device can perform the command indicated by the host command pointers using the reduced pointer storage structure.

Figure 1:
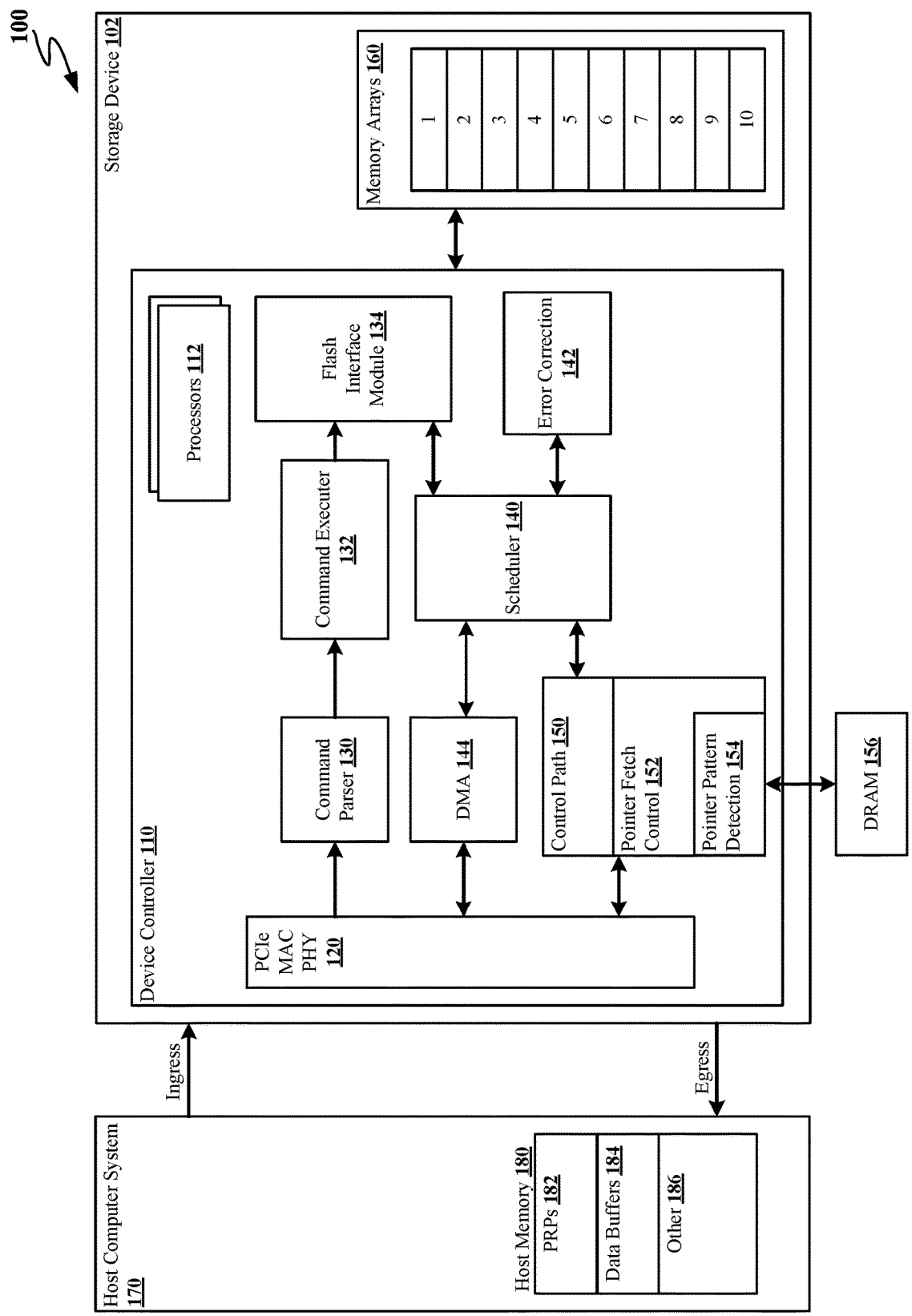
FIG. 1 is a block diagram of an example computing system including a host computer system and a storage device.

FIG. 1 is a block diagram of an example computing system 100 including a host computer system 170 and a storage device 102, such as a solid state drive, for host computer system 170. Host computer system 170 may utilize a non-volatile memory (NVM) included in storage device 102 (shown as memory arrays 160) to write and to read data, such as for long term memory storage. Storage device 102 may be an internal storage drive, such as a notebook hard drive or a desktop hard drive. Storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 102 may take the form of an embedded mass storage device, such as an eSD/eMMC embedded flash drive, embedded in host computer system 170. Storage device 102 may also be any other type of internal storage device, removable storage device, embedded storage device, external storage device, or network storage device.

Host computer system 170 may be a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving).

Host computer system 170 includes a host memory 180, such as DRAM or other main memories. An application program may be stored to host memory 180 for execution by components of host computer system 170. Host memory 180 may include host queue, such as command submission queues and command completion queues. Host memory 180 includes physical region page (PRP) pointers 182, data buffers 184, such as a host data buffer, and other types of memory structures 186.

Storage device 102, includes MAC and PHY components 120, for ingress of communications from host computer system 170 to storage device 102 and egress of communications from storage device 102 to host computer system 170. A link between storage device 102 and host computer system 170 may be any appropriate link, such as a Peripheral Component Interface Express (PCIe) link in this example. A PCIe link may one to thirty-two lanes, depending on the number of available PHYs connecting two PCIe connectors. The PCIe link is typically set during end point device initialization, such as initialization of storage device 102.

The link between host computer system 170 and storage device 102 operates under a communication protocol, such as PCIe serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. In other examples, storage device 102 may also be connected to host computer system 160 through a switch or a bridge.

In the PCIe communication protocol, host computer system 170 and storage device 102 may send requests to each other as transport layer packets (TLPs). TLPs may include an optional TLP prefix, a TLP header, a data payload, and an optional TLP digest. A TLP header includes a type field, which may indicate types of transactions.

As TLPs are transferred between host computer system 170 and storage device 102, a data link layer and physical layer are added to each TLP to ensure the TLP arrives at the intended destination. Each TLP includes a certain overhead from the added data link layer and physical layer. For example, TLP may include an optional end-to-end cyclic redundancy checksum (ECRC) in TLP digest. A data link layer adds the sequence number and link layer CRC (LCRC) to the TLP to ensure successful transmission across the link. A physical layer adds information to mark the beginning and end of the TLP.

Memory arrays 160 of storage device 102 may be configured for long-term storage of information as non-volatile memory space and retains information after power on/off cycles. Memory arrays 160 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. Memory arrays 160 may additionally include one or more types of non-volatile memory.

Storage device 102 includes a device controller 110 which manages operations of storage device 102, such as writes to and reads from memory arrays 160. Controller 110 may include one or more processors 112, which may be multi-core processors. Processors 112 handles the components of storage device 102 through firmware code.

Controller 110 may operate under NVM Express (NVMe) protocol, but other protocols are applicable. NVMe protocol is a communications interface/protocol developed for SSDs to operate over a host and storage device linked over a PCIe interface. NVMe protocol provides a command submission queue and command completion queue for access of data stored in storage device 102 by host computing system 170. Storage device 102 may fetch or read host commands from a command submission queue of host queues of host memory 180.

Controller 110 executes computer-readable program code (e.g., software or firmware) executable instructions (herein referred to as "instructions"). The instructions may be executed by various components of controller 110, such as processors 112, logic gates, switches, application specific integrated circuits (ASICs), programmable logic controllers, embedded microcontrollers, and other components of controller 110.

The instructions are stored in a non-transitory computer readable storage medium. In certain embodiment, the instructions are stored in a non-transitory computer readable storage medium of storage device 102, such as in a read-only memory or memory arrays 160. Instructions stored in storage device 102 may be executed without added input or directions from host computer system 170. In other embodiments, the instructions are transmitted from host computer system 170. The controller 110 is configured with hardware and instructions to perform the various functions described herein and shown in the figures.

Storage device 102 may also include other components, such as flash interface module 134, a direct memory access (DMA) module 144, a scheduler 140, an error correction module 142, a command executor 132, and a control path 150. Flash interface module 134 interacts with memory arrays 160 for read and write operations. Scheduler 140 controls the data transfer while activating control path 150 for fetching physical page regions (PRPs), posting completion and interrupts, and activating the DMA module 144 for the actual data transfer between host computing system 170 and storage device 102. Error correction module 142 corrects the data fetched from memory arrays 160. Command parser 130 fetches commands to command executor 132 for execution on flash interface module 134. DMA module 150 executes data transfers between host computing system 170 and storage device 102.

In general, host computer system 170 initiates data transfers (to storage device 102 or from storage device 102) by transmitting a host command to storage device 102. Over NVMe, the host command may be indicated by a PRP entry or an SGL. In either system, the host command is transmitted as a series of host command pointers to physical memory of host memory 180. In this example, host computer system 170 prepares the data to be transferred in data buffers 184 of host memory 180, and generates a set of pointers to the data to be transferred as PRPs 182. Control path 150, via pointer fetch control 152, receives the host command pointers and stores the host command pointers until the host command can be executed.

In this example, pointer pattern detection 154 is a module of pointer fetch control 152 which can be used to analyze host command pointers received from host computer system 170 to detect patterns in the host command pointers. As described in further detail below, if a pattern can be detected in the host command pointers, pointer pattern detection 154 can store the received pointers in a reduced pointer storage structure. In some examples pointer pattern detection 154 may be implemented as a hardware component of device controller 110, although in other examples pointer pattern detection 154 may be implemented as firmware of device controller 110.

Pointer pattern detection 154 stores host command pointers received from host computer system 170 in DRAM 156. In this example, DRAM 156 is shown outside of storage device 102, however, in other examples host command pointers may instead be stored internal to storage device 102, such as in an SRAM of storage device 102.

Figure 2:
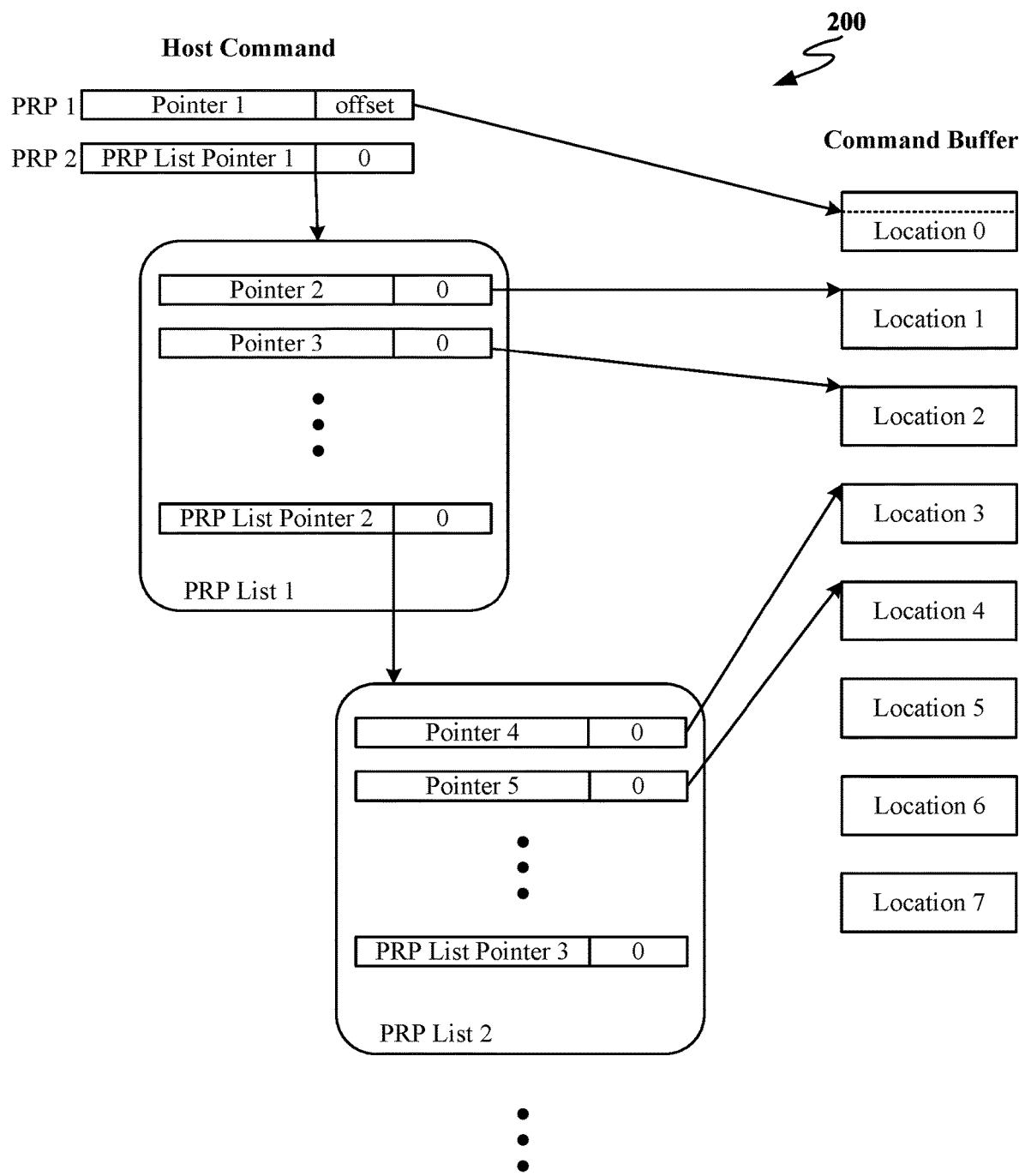
FIG. 2 is a schematic diagram of physical region page (PRP) list structure.

FIG. 2 is a schematic diagram of structure of a physical region page (PRP) list 200. In this example, list 200 shows pointers that indicate the physical memory locations corresponding to the command buffer storing data for transfer between a host computer to a storage device. The host command is indicated by PRP 1 and PRP 2. PRP 1 includes pointer 1, pointing to the first physical memory location of the data to be transferred by the host command, location 0. PRP 2 includes PRP list pointer 1, a pointer to a first PRP list component, PRP list 1.

PRP list 1 includes a number of pointers to physical memory locations. In this example, pointer 2 points to location 1 and pointer 3 points to location 2. The end of PRP list 1 is PRP list pointer 2, which points to a second PRP list component, PRP list 2.

As can be seen in this example, a particular host command indicated via PRP entries may include a large number of pointers to physical memory locations. When the host command is transferred to the storage device, the initial PRP entry transferred includes PRP 1 and PRP 2. The storage device stores pointer 1 of PRP 1, and uses PRP 2 to access PRP list 1. Then, the storage device receives and stores all pointers of PRP list 1 (including pointer 2 and pointer 3), and then uses PRP list pointer 2 to access PRP list 2. Then the storage device received and stores all pointers of PRP list 2 (including pointer 4 and pointer 5), and continues to follow the structure of PRP list 200 until all pointers referring to the command buffer locations are received.

In other examples, the host command may be indicated by SGL rather than PRP entries. In such examples, the host command is transmitted as an SGL segment descriptor, which points to a set of SGL data block descriptors, which include pointers to physical memory locations, such as locations 0-7. The last descriptor in a set of SGL data block descriptors is an SGL last segment descriptor, which points to a second set of SGL data block descriptors. Again, when used to indicate a host command, the storage device receiving the host command stores each pointer of the SGL data block descriptors until all pointers corresponding to the command buffer are received.

Figure 3A:
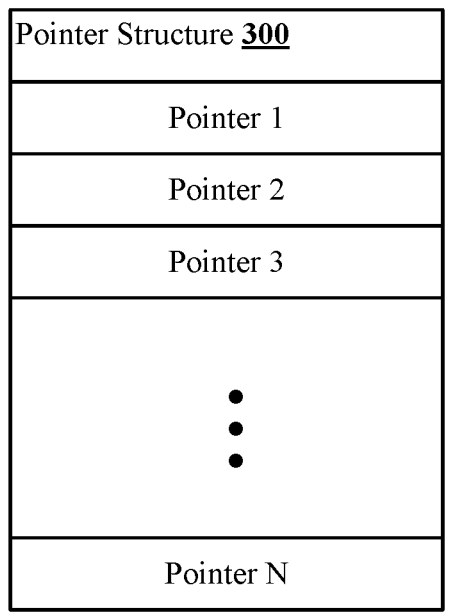
FIG. 3A is a block diagram of an example pointer structure for storing pointers of host commands.

FIG. 3A is a block diagram of an example pointer structure 300 for storing pointers of host commands. Pointer structure 300 demonstrates a structure for storing host command pointers as used in current storage device systems. In general, pointer structure 300 stores host command pointers of one host command, in this example pointers 1-3 and pointer N. Because pointer structure 300 includes all pointers received for the host command stored as received, the memory space needed by pointer structure 300 may be arbitrarily large depending on the size of data transfer corresponding to the host command.

Figure 3B:
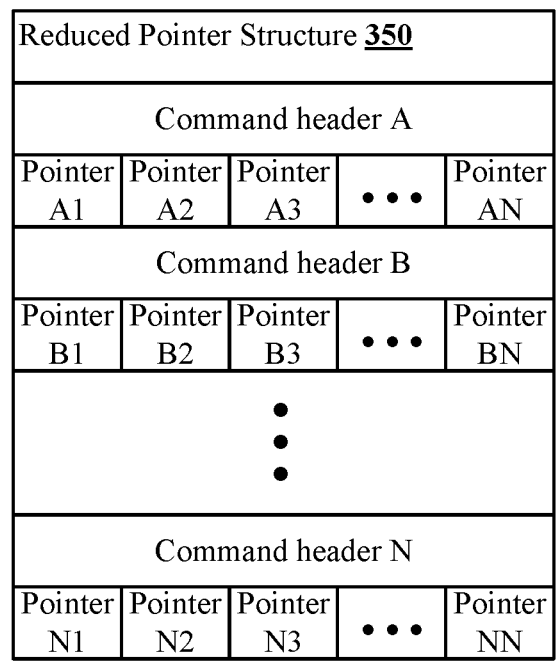
FIG. 3B is a block diagram of an example reduced pointer structure for storing pointers of host commands.

FIG. 3B is a block diagram of an example reduced pointer structure 350 for storing pointers of host commands. Reduced pointer structure 350 can be used when a pattern has been detected in host command pointers. Reduced pointer structure 350 in this example stores three host commands, indicated by command header A, command header B and command header N.

The command headers indicate details of the pattern of the corresponding host command pointers. That is, command header A includes the details of the pattern of pointers A1 through AN. Because the command headers include the details of the pattern, the only data stored for the pointers is the parts of the pointers differing from the pattern. Because the repetitive information of the pointers is omitted from storage, the memory space needed to store the pointers is reduced compared to standard pointer storage structures, such as pointer structure 300.

Many kinds of patterns, or pattern types, may be detected and used in storing host command pointers. For example, some host command pointers may create a contiguous buffer, such as when host command pointers have ascending physical location addresses across pointers, or have descending physical location addresses across pointers. For example, if three host command pointers are "44129000", "4412A000" and "44126000," a pattern of ascending physical location addresses can be detected. This pattern indicates a contiguous buffer starting with the address "44129000". In this example, a reduced pointer structure for this host command would only need to store the first address, "44129000", the distance between each address according to the pattern, and the number of pointers, to completely store the host command.

Other patterns that may be detected are pointers that follow patterns with parts of their bits or pointers that have a constant different between physical location addresses. As an example of a partial pattern, four host command pointers may be "15EC6000", "17DC7000", "8A8C8000" and "848C9000". In this example the first four digits of the addresses change while the last four digits of the addresses are continuous. In this example, a reduced pointer structure for this host command could store, instead of the entirety of each pointer, the part of each pointer not complying to the pattern, (e.g., "15EC," "17DC," "8A8C" and "848C"), in this case storing half of each pointer compared to a standard pointer structure.

Other patterns may be detected across multiple host commands, rather than in a command, such as detecting that starting pointers of all host commands refer to a common base address. Many other possible patterns may be possible other than the types of patterns enumerated here.

Figure 4:
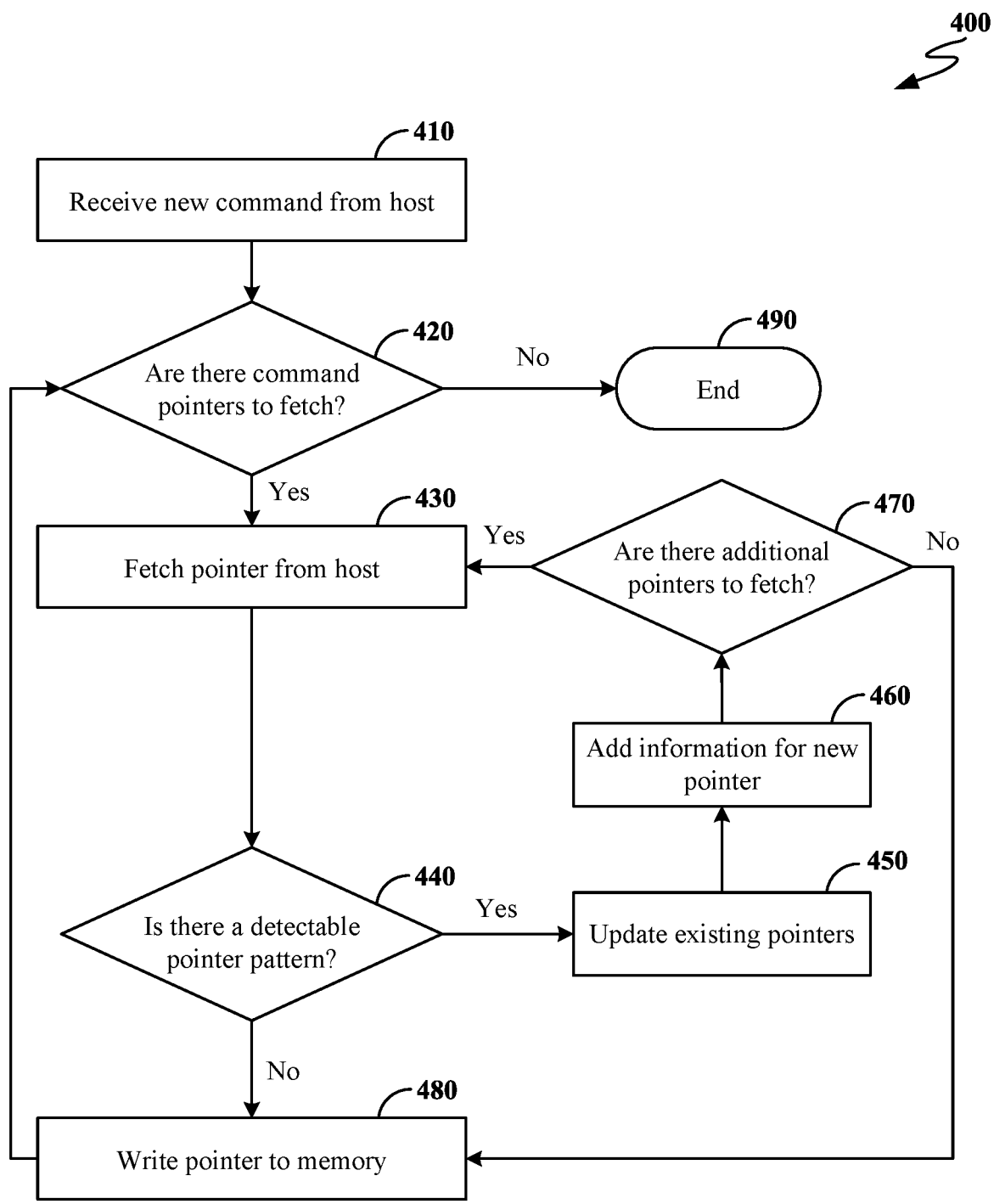
FIG. 4 is a flow diagram of an example process for generating a reduced pointer structure for storing pointers of host commands.

FIG. 4 is a flow diagram of an example process 400 for generating a reduced pointer structure for storing pointers of host commands. Process 400 may be performed by a device controller of a storage device, such as device controller 110 of FIG. 1. Process 400 begins at 410, where a new host command is received from a host computer connected to the storage device. When a new host command is received, at 420, the device controller determines if there are any command pointers to fetch for the host command. On a first pass there will be at least one host command pointer to fetch for the host command. On subsequent passes, if there are no command pointers to fetch, process 420 proceeds to 490 and ends.

If there are command pointers to fetch, process 400 proceeds to 430, where a command pointer is fetched from the host. Based on this command pointer, at 400 the device controller determines if there is a detectable pattern at 440 within the host command pointers thus far received. If a pattern is not detected, process 400 proceeds to 480, where the pointer fetched at 430 is written to memory, and process 400 returns to 420.

If a pattern is detected, process 400 proceeds to 450, where existing pointers already written are updated as needed. For example, the detected pattern may indicate that certain parts of stored pointers may not be needed, or may indicate that some entire pointers are not needed. Thereafter, at 460 the device controller adds information for the new pointer fetched at 430. Depending on the pattern, only some of the new pointer may be stored at 460.

At 470 the device controller determines if there are any additional pointers to fetch. If there are additional pointers to fetch, process 400 returns to 470 where a next pointer is fetched. If there are not additional pointers to fetch, process 400 proceeds to 480, where the last fetched command pointer is written to memory.

In general, the loop from 430 to 470 continues until all pointers are received, causing process 400 to proceed from 470 to 480, or upon receipt of a pointer not within a detected pattern causing process 400 to proceed from 440 to 480. Process 400 terminates when all possible command pointers are received. Thereafter process 400 begins again upon receipt of subsequent host commands from the host computer.

By detecting host command patterns and storing host command pointers in a reduced pointer structure, a number of advantages over existing storage device performance may be realized. First, because a reduced pointer structure uses less memory space than a standard pointer structure, the memory in storage devices dedicated to storing host command pointers can be reduced. Second, because the reduced pointer structure is a smaller amount of data, searching for a matching pointer to transfer as part of the host command takes less time, as there is less data to search through than in standard pointer structures. Third, when a contiguous data buffer can be identified by the host command pattern, the host command may be executed as a single transfer along the bus connecting the storage device and the host computer. Host commands executed as a single transfer improves the performance of the storage device performance, as well as the transfer efficiency of the storage, compared to storage devices not utilizing the reduced pointer structure.

In one embodiment, a storage device comprises a non-volatile memory; and a controller configured to, upon receipt of a host command from a host computer connected to the storage device, analyze host command pointers associated with the host command for a host command pattern and upon detecting the host command pattern, store the host command pointers in a reduced pointer structure. The controller is configured to execute the host command based on the reduced pointer structure. The host computer interfaces with the storage device via non-volatile memory express (NVMe) protocol. The host command is indicated by a physical request page (PRP) entry. The host command is indicated by a scatter gather list (SGL). The reduced pointer structure stores a command header for the host command, wherein the command header indicates a pattern type of the host command pattern. The storage device further comprises a pattern pointer detector. The storage device further comprises a pointer fetch controller.

In another embodiment, a storage device, comprises a non-volatile memory and a controller coupled to the non-volatile memory. The controller is configured to receive from a host computer, at least one host command pointer associated with a host command, detect, based on the at least one host command pointer, a host command pattern of the host command and store, in a reduced pointer structure, the at least one host command pointer. The controller is configured to execute the host command based on the reduced pointer structure. The controller is configured to update any existing pointers. The host command is indicated by a physical request page (PRP) entry. The host command is indicated by a scatter gather list (SGL). The reduced pointer structure stores a command header for the host command, wherein the command header indicates a pattern type of the host command pattern. The storage device further comprises a pointer fetch control coupled to a control path. The storage device further comprises a pointer pattern detector coupled to the pointer fetch control.

In another embodiment, a storage device, comprising a non-volatile memory, means to detect, based on at least one host command pointer, a host command pattern of a host command and means to create a reduced pointer structure based upon the detected host command pattern. The storage device further comprises means to execute the host command based on the reduced pointer structure. The host command is indicated by a physical request page (PRP) entry. The host command is indicated by a scatter gather list (SGL).

While the foregoing is directed to embodiments of the present disclosure, other and further embodiments of the disclosure may be devised without departing from the basic scope thereof, and the scope thereof is determined by the claims that follow.

What is claimed is:

1. A storage device configured to be coupled to a host computer with a host data buffer, comprising:
   a non-volatile memory; and
   a controller configured to:
   receive a host command with a plurality of host command pointers from the host computer;

upon receipt of the host command from the host computer, analyze the plurality of host command pointers associated with the host command for a host command pattern;

upon detecting the host command pattern, update existing pointers associated with the plurality of host command pointers; and store the updated existing pointers in a reduced pointer structure, wherein the reduced pointer structure comprises a command header and pointers, wherein the command header comprises the details of the host command pattern, wherein the pointers comprise parts of the host command pointers differing from the host command pattern, and wherein the entire reduced pointer structure is stored together.

2. The storage device of claim 1, wherein the controller is further configured to execute the host command based on the reduced pointer structure.

3. The storage device of claim 1, wherein the host computer interfaces with the storage device via non-volatile memory express (NVMe) protocol.

4. The storage device of claim 3, wherein the host command is indicated by a physical request page (PRP) entry.

5. The storage device of claim 3, wherein the host command is indicated by a scatter gather list (SGL).

6. The storage device of claim 1, wherein the reduced pointer structure stores a command header for the host command, wherein the command header indicates a pattern type of the host command pattern.

7. The storage device of claim 1, further comprising a pattern pointer detector.

8. The storage device of claim 1, further comprising a pointer fetch controller.

9. A storage device configured to be coupled to a host computer with a host data buffer, comprising:

a non-volatile memory; and a controller coupled to the non-volatile memory, the controller is configured to:

receive from the host computer, a plurality of host command pointer associated with a host command;

detect, based on the plurality of host command pointers, a host command pattern of the host command;

update existing pointers associated with the plurality of host command pointers;

store, in a reduced pointer structure, the updated existing pointers, wherein the reduced pointer structure comprises a command header and pointers, wherein the command header comprises the details of the host command pattern, wherein the pointers comprise parts of the host command pointers differing from the host command pattern, and wherein the entire reduced pointer structure is stored together; and search the reduced pointer structure for a particular host command pointer of the plurality of host command pointers to conduct a data transfer between a physical location in the host data buffer indicated by the particular host command pointer and the non-volatile memory.

10. The storage device of claim 9, wherein the controller is further configured to execute the host command based on the reduced pointer structure.

11. The storage device of claim 9, wherein the controller is further configured to update any existing pointers.

12. The storage device of claim 11, wherein the host command is indicated by a physical request page (PRP) entry.

13. The storage device of claim 11, wherein the host command is indicated by a scatter gather list (SGL).

14. The storage device of claim 9, wherein the reduced pointer structure stores a command header for the host command, wherein the command header indicates a pattern type of the host command pattern.

15. The storage device of claim 9, further comprising a pointer fetch control coupled to a control path.

16. The storage device of claim 15, further comprising a pointer pattern detector coupled to the pointer fetch control.

17. A storage device, comprising:

a non-volatile memory; and a pointer pattern detection means for:

detecting, based on a plurality of host command pointers, a host command pattern of a host command;

creating a reduced pointer structure based upon the detected host command pattern, wherein the reduced pointer structure comprises a command header and pointers, wherein the command header comprises the details of the host command pattern, wherein the pointers comprise parts of the host command pointers differing from the host command pattern, and wherein the entire reduced pointer structure is stored together; and updating existing pointers of the reduced pointer structure based on the detected host command pattern.

18. The storage device of claim 17, further comprising a command executer means for executing the host command based on the reduced pointer structure.

19. The storage device of claim 17, wherein the host command is indicated by a physical request page (PRP) entry.

20. The storage device of claim 17, wherein the host command is indicated by a scatter gather list (SGL).

* * * * *